(12) United States Patent
Takizawa

(10) Patent No.: US 6,356,988 B1
(45) Date of Patent: Mar. 12, 2002

(54) MEMORY ACCESS SYSTEM, ADDRESS CONVERTER, AND ADDRESS CONVERSION METHOD CAPABLE OF REDUCING A MEMORY ACCESS TIME

(75) Inventor: Tetsuro Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/480,703

(22) Filed: Jan. 7, 2000

(30) Foreign Application Priority Data

Jan. 7, 1999 (JP) ............................................. 11-001679

(51) Int. Cl.$^7$ .......................... G06F 12/00; G06F 12/10
(52) U.S. Cl. .......................... 711/202; 711/5; 711/157; 365/230.03; 345/571; 345/564
(58) Field of Search .............................. 711/5, 202, 210, 711/157, 167, 216, 217, 150, 173; 365/230.03, 230.04, 230.01; 345/536, 540, 564–574

(56) References Cited

U.S. PATENT DOCUMENTS

| | | | | |
|---|---|---|---|---|
| 4,773,044 A | * | 9/1988 | Sfarti et al. | 711/211 |
| 5,652,861 A | * | 7/1997 | Mayo et al. | 711/157 |
| 5,818,433 A | * | 10/1998 | Sherburns | 345/500 |
| 5,995,080 A | * | 11/1999 | Biro et al. | 345/603 |
| 6,041,393 A | * | 3/2000 | Hsu | 711/157 |
| 6,144,392 A | * | 11/2000 | Rogers | 345/537 |
| 6,208,354 B1 | * | 3/2001 | Porter | 345/634 |
| 6,215,507 B1 | * | 4/2001 | Nally et al. | 345/568 |
| 6,226,720 B1 | * | 5/2001 | Henderson et al. | 711/157 |
| 6,233,662 B1 | * | 5/2001 | Prince, Jr. | 711/157 |

* cited by examiner

Primary Examiner—Hong Kim
(74) Attorney, Agent, or Firm—Scully, Scott, Murphy & Presser

(57) ABSTRACT

On storing two-dimensional arrangement data into a memory (1) having banks, $2^n$ in number, each of which is individually assigned with a bank number B and includes row addresses identified by row address numbers A, an address converter (3) calculates, in response to a coordinate (X, Y) representing a particular data element of the data elements of the two-dimensional arrangement data, the bank number B of a particular bank of the banks where the particular data element is to be memorized. The bank number B is given by:

$$B=\{Y\times(2^n\times m+k)+X\}\bmod 2^n,$$

where m is a positive integer, where k is a positive integer smaller than $2^n$ and other than 1, and where mod is an operator for calculating a remainder. The address converter also calculates the row address number A of a particular address of the row addresses of the particular bank where the particular data element is to be memorized. The address number A is given by:

$$A=\mathrm{INT}[\{Y\times(2^n\times m+k)+X\}/2^n],$$

where INT is an operator for obtaining an integral quotient. The bank number B and the row address number A thus calculated are supplied to the memory. By using the address converter, it is possible to efficiently access the memory which is inhibited from successively accessing different addresses within the same bank.

10 Claims, 4 Drawing Sheets

| Y\X | 0 | 1 | 2 | 3 | 4 | 5 | 6 | 7 | 8 | 9 |
|---|---|---|---|---|---|---|---|---|---|---|
| 0 | B=0 A=0 | B=1 A=0 | B=2 A=0 | B=3 A=0 | B=4 A=0 | B=5 A=0 | B=6 A=0 | B=7 A=0 | B=0 A=1 | B=1 A=1 |
| 1 | B=2 A=1 | B=3 A=1 | B=4 A=1 | B=5 A=1 | B=6 A=1 | B=7 A=1 | B=0 A=2 | B=1 A=2 | B=2 A=2 | B=3 A=2 |
| 2 | B=4 A=2 | B=5 A=2 | B=6 A=2 | B=7 A=2 | B=0 A=3 | B=1 A=3 | B=2 A=3 | B=3 A=3 | B=4 A=3 | B=5 A=3 |
| 3 | B=6 A=3 | B=7 A=3 | B=0 A=4 | B=1 A=4 | B=2 A=4 | B=3 A=4 | B=4 A=4 | B=5 A=4 | B=6 A=4 | B=7 A=4 |
| 4 | B=0 A=5 | B=1 A=5 | B=2 A=5 | B=3 A=5 | B=4 A=5 | B=5 A=5 | B=6 A=5 | B=7 A=5 | B=0 A=6 | B=1 A=6 |
| 5 | B=2 A=6 | B=3 A=6 | B=4 A=6 | B=5 A=6 | B=6 A=6 | B=7 A=6 | B=0 A=7 | B=1 A=7 | B=2 A=7 | B=3 A=7 |
| 6 | B=4 A=7 | B=5 A=7 | B=6 A=7 | B=7 A=7 | B=0 A=8 | B=1 A=8 | B=2 A=8 | B=3 A=8 | B=4 A=8 | B=5 A=8 |
| 7 | B=6 A=8 | B=7 A=8 | B=0 A=9 | B=1 A=9 | B=2 A=9 | B=3 A=9 | B=4 A=9 | B=5 A=9 | B=6 A=9 | B=7 A=9 |

FIG. 3

| Y\X | 0 | 1 | 2 | 3 | 4 | 5 | 6 | 7 | 8 | 9 |
|---|---|---|---|---|---|---|---|---|---|---|
| 0 | B=0 A=0 | B=2 A=0 | B=4 A=0 | B=6 A=0 | B=1 A=0 | B=3 A=0 | B=5 A=0 | B=7 A=0 | B=0 A=1 | B=2 A=1 |
| 1 | B=4 A=1 | B=6 A=1 | B=1 A=1 | B=3 A=1 | B=5 A=1 | B=7 A=1 | B=0 A=2 | B=2 A=2 | B=4 A=2 | B=6 A=2 |
| 2 | B=1 A=2 | B=3 A=2 | B=5 A=2 | B=7 A=2 | B=0 A=3 | B=2 A=3 | B=4 A=3 | B=6 A=3 | B=1 A=3 | B=3 A=3 |
| 3 | B=5 A=3 | B=7 A=3 | B=0 A=4 | B=2 A=4 | B=4 A=4 | B=6 A=4 | B=1 A=4 | B=3 A=4 | B=5 A=4 | B=7 A=4 |
| 4 | B=0 A=5 | B=2 A=5 | B=4 A=5 | B=6 A=5 | B=1 A=5 | B=3 A=5 | B=5 A=5 | B=7 A=5 | B=0 A=6 | B=2 A=6 |
| 5 | B=4 A=6 | B=6 A=6 | B=1 A=6 | B=3 A=6 | B=5 A=6 | B=7 A=6 | B=0 A=7 | B=2 A=7 | B=4 A=7 | B=6 A=7 |
| 6 | B=1 A=7 | B=3 A=7 | B=5 A=7 | B=7 A=7 | B=0 A=8 | B=2 A=8 | B=4 A=8 | B=6 A=8 | B=1 A=8 | B=3 A=8 |
| 7 | B=5 A=8 | B=7 A=8 | B=0 A=9 | B=2 A=9 | B=4 A=9 | B=6 A=9 | B=1 A=9 | B=3 A=9 | B=5 A=9 | B=7 A=9 |

FIG. 4

MEMORY ACCESS SYSTEM, ADDRESS CONVERTER, AND ADDRESS CONVERSION METHOD CAPABLE OF REDUCING A MEMORY ACCESS TIME

BACKGROUND OF THE INVENTION

This invention relates to a memory access system, an address converter, and an address conversion method and, in particular, to address conversion upon accessing a memory divided into a plurality of banks.

In calculation by a computer, an operation speed not only depends upon an instruction execution speed of a CPU (Central Processing Unit) but also upon a memory access time required for the CPU to access a memory. Therefore, a reduction in memory access time greatly contributes to an increase in operation speed of the calculation by the computer.

In view of the above, proposal is made of a memory divided into a plurality of banks some of which can simultaneously be activated so as to increase an average access speed upon carrying out random access. Each bank includes a plurality of row addresses and at least one column address. As the memory of the type described, a SDRAM (Synchronous Dynamic Random Access Memory) and a Direct Rambus DRAM (Dynamic Random Access Memory) are known.

In the SDRAM, a plurality of banks can simultaneously be activated but the successive access to different row addresses in the same bank is inhibited. This is because, in order to successively access the different row addresses in the same bank, the memory must temporarily be inactivated. This results in occurrence of a delay in memory access.

In the Direct Rambus DRAM also, a plurality of banks can simultaneously be activated. However, limitation or inhibition is imposed not only upon the successive access to the different row addresses in the same bank but also upon the successive access to adjacent ones of the banks. This is because a sense amplifier is generally shared by the adjacent banks. Specifically, in order to successively access the different row addresses in the same bank or to successively access the adjacent banks, the memory must temporarily be inactivated. This results in occurrence of a delay in memory access.

In case where either one of the above-mentioned memories is used and completely random addresses are accessed, the necessity of temporarily inactivating the memory arises at a low probability as compared with a memory having a single bank structure. In other words, parallel access is allowed at a high probability so that the average access speed is increased. However, if those addresses to be accessed are concentrated to the same row address in the same bank or to any row addresses in the adjacent banks, such parallel access can not substantially be carried out. This inhibits the increase in average access speed.

In particular, consideration will be made about an application program for image processing. In the image processing, two-dimensional image data (or two-dimensional arrangement data) including a plurality of data elements represented by a plurality of XY coordinates are memorized in the memory by successively assigning the XY coordinates to the addresses in one-to-one correspondence. In the image processing, it is often that the access is successively made to a series of those data elements successive in a horizontal direction and thus contained in a horizontal region or that the access is successively made to a block of data elements contained in a rectangular region. Therefore, in case where such application program is executed, it is highly probable that the access is successively made to different row addresses in the same bank or to the adjacent banks. In this event, it is impossible to efficiently increase the average access speed in memory access.

SUMMARY OF THE INVENTION

It is therefore an object of this invention to provide a memory access system, an address converter, and an address conversion method which are capable of efficiently accessing a memory comprising a plurality of banks under the limitation or inhibition imposed upon successive access to different row addresses in the same bank and upon successive access to adjacent ones of the banks.

According to a first aspect of this invention, there is provided a memory access system comprising:

a memory divided into a plurality of banks, $2^n$ in number (n being an integer greater than one), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y);

a memory access unit for accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory; and an address converter comprising a bank number calculating unit for calculating, in response to the coordinate (X, Y) corresponding to said particular data element, the bank number B of a particular bank of said banks where said particular data element is to be memorized, and a row address number calculating unit for calculating, in response to the coordinate (X, Y) corresponding to said particular data element, the row address number A of a particular address of the row addresses of said particular bank where said particular data element is to be memorized, the bank number B and the row address number A being given by:

$$B = \{Y \times (2^n \times m + k) + X\} \bmod 2^n$$

$$A = \mathrm{INT}[\{Y \times (2^n \times m + k) + X\} / 2^n],$$

where m is a positive integer, where k is a positive integer smaller than $2^n$ and other than 1, where mod is an operator for calculating a remainder, and where INT is an operator for obtaining an integral quotient;

the bank number B and the row address number A thus calculated being supplied to said memory.

According to a second aspect of this invention, there is provided a memory access system comprising:

a memory divided into a plurality of banks, $2^n$ in number (n being an integer greater than two), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y);

a memory access unit for accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory; and an address converter comprising a bank number calculating unit for calculating, in response to the coordinate (X, Y) corresponding to said particular data element, the bank number B of a particular bank of said banks where said particular data element is to be memorized, and a row address number calculating unit for calculating, in response to the coordinate (X, Y) corresponding to said particular data element, the row address number A of a particular address of the row addresses of said particular bank where said particular data element is to be memorized, the bank number B and the row address number A being given by:

$$B = [\{Y \times (2^n \times m + k) + X\} \bmod 2^{n-1}] \times 2 + \mathrm{INT}([\{Y \times (2^n \times m + k) + X\} \bmod 2^n]/2^{n-1})$$

$$A = \mathrm{INT}[\{Y \times (2^n \times m + k) + X\}/2^n],$$

where m is a positive integer, where k is a positive integer smaller than $2^n$ and other than 1, $2^{n-1}-1$, $2^{n-1}$, $2^{n-1}+1$, where mod is an operator for calculating a remainder, and where INT is an operator for obtaining an integral quotient;

the bank number B and the row address number A thus calculated being supplied to said memory.

According to a third aspect of this invention, there is provided an address converter for use in combination with a memory and a memory access unit, said memory being divided into a plurality of banks, $2^n$ in number (n being an integer greater than one), each of which is individually assigned with a bank number B (B being an integer satisfying $0 \leq B \leq 2^{n-1}$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address converter comprising:

a bank number calculating unit for calculating, in response to the coordinate (X, Y) corresponding to said particular data element, the bank number B of a particular bank of said banks where said particular data element is to be memorized; and a row address number calculating unit for calculating, in response to the coordinate (X, Y) corresponding to said particular data element, the address number A of a particular address of the addresses of said particular bank where said particular data element is to be memorized;

the bank number B and the row address number A being given by:

$$B = \{Y \times (2^n \times m + k) + X\} \bmod 2^n$$

$$A = \mathrm{INT}[\{Y \times (2^n \times m + k) + X\}/2^n],$$

where m is a positive integer, where k is a positive integer smaller than $2^n$ and other than 1, where mod is an operator for calculating a remainder, and where INT is an operator for obtaining an integral quotient;

the bank number B and the row address number A thus calculated being supplied to said memory.

According to a fourth aspect of this invention, there is provided an address converter for use in combination with a memory and a memory access unit, said memory being divided into a plurality of banks, $2^n$ in number (n being an integer greater than two), each of which is individually assigned with a bank number B (B being an integer satisfying $0 \leq B \leq 2^{n-1}$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address converter comprising:

a bank number calculating unit for calculating, in response to the coordinate (X, Y) corresponding to said particular data element, the bank number B of a particular bank of said banks where said particular data element is to be memorized; and a row address number calculating unit for calculating, in response to the coordinate (X, Y) corresponding to said particular data element, the row address number A of a particular address of the row addresses of said particular bank where said particular data element is to be memorized;

the bank number B and the row address number A being given by:

$$B = [\{Y \times (2^n \times m + k) + X\} \bmod 2^{n-1}] \times 2 + \mathrm{INT}([\{Y \times (2^n \times m + k) + X\} \bmod 2^n]/2^{n-1})$$

$$A = \mathrm{INT}[\{Y \times (2^n \times m + k) + X\}/2^n],$$

where m is a positive integer, where k is a positive integer smaller than $2^n$ and other than 1, $2^{n-1}-1$, $2^{n-1}$, $2^{n-1}+1$, where mod is an operator for calculating a remainder, and where INT is an operator for obtaining an integral quotient;

the bank number B and the row address number A thus calculated being supplied to said memory.

According to a fifth aspect of this invention, there is provided an address conversion method carried out in an address converter which is for use in combination with a memory and a memory access unit, said memory being divided into a plurality of banks, $2^n$ in number (n being an integer greater than one), each of which is individually assigned with a bank number B (B being an integer satisfying $0 \leq B \leq 2^{n-1}$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address conversion method comprising:

a bank number calculating step of calculating, in response to the coordinate (X, Y) corresponding to said particular data element, the bank number B of a particular bank of said banks where said particular data element is to be memorized, the bank number B being given by:

$$B = \{Y \times (2^n \times m + k) + X\} \bmod 2^n,$$

where m is a positive integer, where k is a positive integer smaller than $2^n$ and other than 1, and where mod is an operator for calculating a remainder, integral quotient; and a row address number calculating step of calculating, in response to the coordinate (X, Y) corresponding to said particular data element, the address number A of a particular address of the row addresses of said particular bank where said particular data element is to be memorized, the row address number A being given by:

$$A = \text{INT}[\{Y \times (2^n \times m + k) + X\} / 2^n],$$

where INT is an operator for obtaining an integral quotient; the bank number B and the row address number A thus calculated being supplied to said memory.

According to a sixth aspect of this invention, there is provided an address conversion method carried out in an address converter which is for use in combination with a memory and a memory access unit, said memory being divided into a plurality of banks, $2^n$ in number (n being an integer greater than two), each of which is individually assigned with a bank number B (B being an integer satisfying $0 \leq B \leq 2^n - 1$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address conversion method comprising:

a bank number calculating step of calculating, in response to the coordinate (X, Y) corresponding to said particular data element, the bank number B of a particular bank of said banks where said particular data element is to be memorized, the bank number B being given by:

$$B = [\{Y \times (2^n \times m + k) + X\} \bmod 2^{n-1}] \times 2 + \text{INT}([\{Y \times (2^n \times m + k) + X\} \bmod 2^n] / 2^{n-1}),$$

where m is a positive integer, where k is a positive integer smaller than $2^n$ and other than 1, $2^{n-1} - 1$, $2^{n-1}$, $2^{n-1} + 1$, where mod is an operator for calculating a remainder, and where INT is an operator for obtaining an integral quotient; and a row address number calculating step of calculating, in response to the coordinate (X, Y) corresponding to said particular data element, the row address number A of a particular address of the row addresses of said particular bank where said particular data element is to be memorized, the row address number A being given by:

$$A = \text{INT}[\{Y \times (2^n \times m + k) + X\} / 2^n];$$

the bank number B and the row address number A thus calculated being supplied to said memory.

BRIEF DESCRIPTION OF THE DRAWING

FIG. 3 is a view for describing address conversion in a memory access system according to a first embodiment of this invention; and FIG. 4 is a view for describing address conversion in a memory access system according to a second embodiment of this invention.

DESCRIPTION OF PREFERRED EMBODIMENTS

Figure 1:
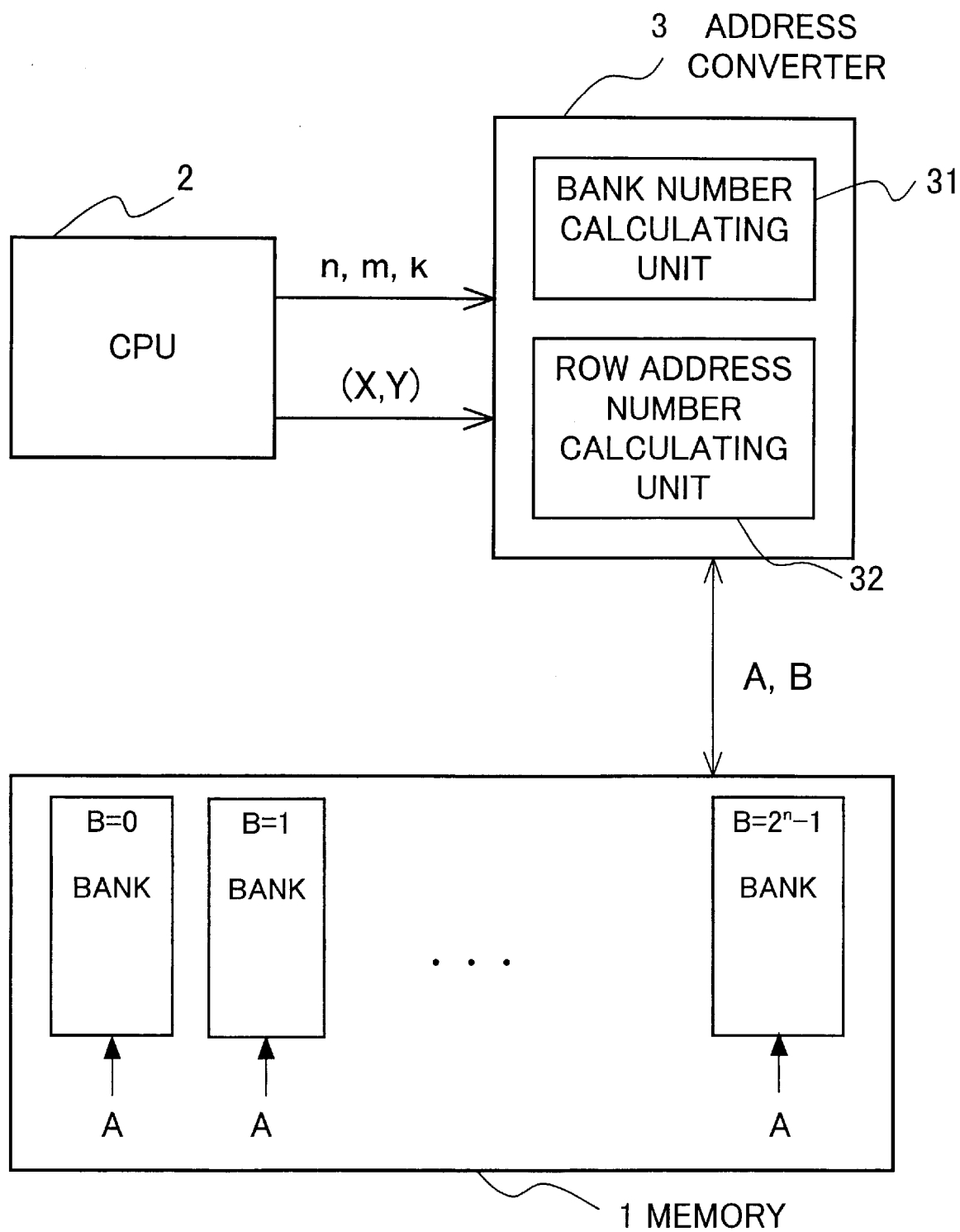
FIG. 1 is a block diagram showing a memory access system according to this invention.

Now, description will be made about this invention with reference to the drawing.
First Embodiment Referring to FIGS. 1, 2, and 3, description will be made as regards a memory access system according to a first embodiment of this invention.

In FIG. 1, the memory access system according to the first embodiment includes a memory 1, a CPU (or a memory access unit) 2, and an address converter 3.

The memory 1 is divided into a plurality of banks, $2^n$ in number (n being an integer greater than one), each of which is individually assigned with a bank number B (B being an integer satisfying $0 \leq B \leq 2^n - 1$).

Figure 2:
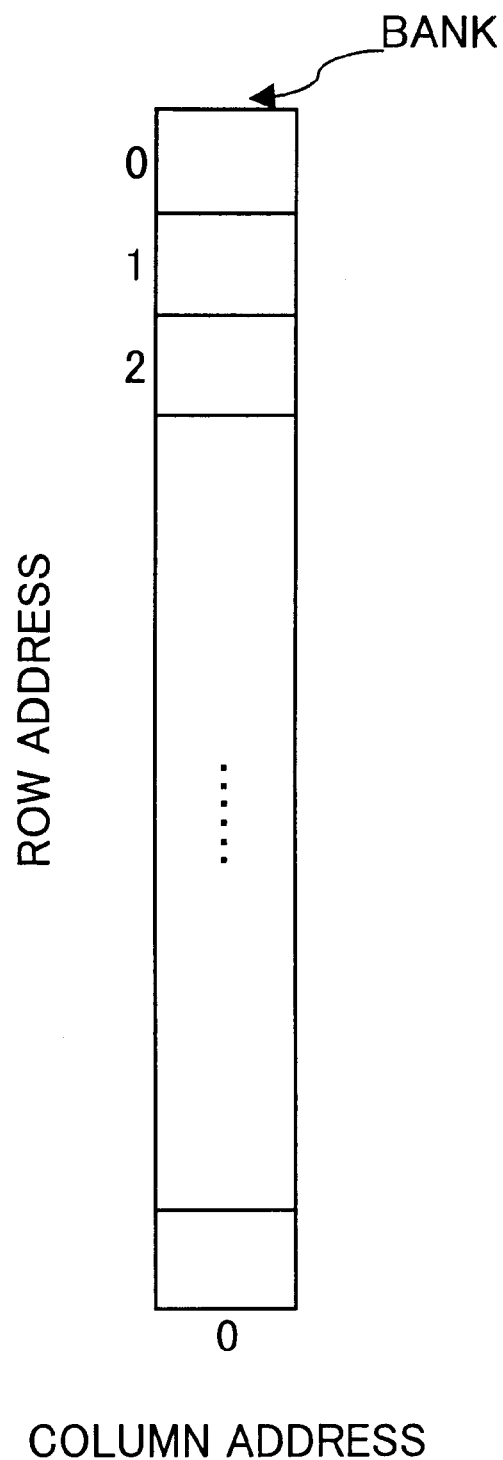
FIG. 2 is a diagram of each bank of a memory of a memory access system illustrated in FIG. 1.

As shown in FIG. 2, each bank includes at least one column address and a plurality of row addresses identified by row address numbers A (A being an integer satisfying $A \geq 0$). In the example being illustrated, it is not necessary to specify the column address in accessing the memory 1 because the column size is equal to one (that is, because the column address is one).

In FIG. 1, the memory 1 is inhibited from successively accessing different row addresses within the same bank of the banks. The memory 1 is for use in memorizing two-dimensional arrangement data comprising a plurality of data elements each of which is represented by a coordinate (X, Y).

The CPU (or the memory access unit) 2 accesses the memory 1 to store the two-dimensional arrangement data into the memory 1. The CPU (or the memory access unit) 2 produces the coordinate (X, Y) corresponding to a particular data element of the data elements of the two-dimensional arrangement data when the CPU (or the memory access unit) 2 accesses the memory 1 to store the particular data element into the memory 1.

The address converter 3 includes a bank number calculating unit 31 and a row address number calculating unit 32.

The bank number calculating unit 31 calculates, in response to the coordinate (X, Y) corresponding to the particular data element, the bank number B of a particular bank of the banks where the particular data element is to be memorized.

The row address number calculating unit 32 calculates, in response to the coordinate (X, Y) corresponding to the particular data element, the address number A of a particular address of the row addresses of the particular bank where the particular data element is to be memorized.

The bank number B and the row address number A are given by:

$$B=\{Y\times(2^n\times m+k)+X\}\bmod 2^n \quad (1)$$

$$A=\text{INT}[\{Y\times(2^n\times m+k)+X\}/2^n] \quad (2),$$

where m is a positive integer, where k is a positive integer smaller than $2^n$ and other than 1, where mod is an operator for calculating a remainder, and where INT is an operator for obtaining an integral quotient.

The bank number B and the row address number A thus calculated are supplied to the memory 1.

The memory access system will be described more in detail. The memory 1 is constituted by an SDRAM and has a plurality of the banks. Limitation or inhibition is imposed upon successive access to different row addresses in the same bank. This means that the different row addresses in the same bank can not successively be accessed. In the memory 1, the banks are arranged in a predetermined direction (horizontal direction in this embodiment) and sequentially assigned with bank numbers $0, 1, 2, \ldots, 2^n-1$, respectively.

In this embodiment, the memory 1 memorizes two-dimensional arrangement data such as bitmap image data. The two-dimensional arrangement data comprises a plurality of data elements each of which has a coordinate represented by (X, Y).

The CPU 2 successively executes instruction codes contained in a program and carries out various operations described by the program.

Upon execution of an instruction code to access the memory 1 for a particular data element having a particular coordinate (X, Y), the CPU 2 sends the particular coordinate to the address converter 3. The address converter 3 calculates from the particular coordinate (X, Y) a bank number B and a row address number A of a particular address. Then, the memory 1 is accessed at the particular address.

The address converter 3 carries out address conversion when the CPU 2 accesses the memory 1 and comprises hardware components logically connected so as to execute arithmetic operations given by the Equations (1) and (2). In order to carry out address conversion, the address converter 3 is successively supplied from the CPU 2 with various values including an index number n of the number $2^n$ of the banks in the memory 1, m, and k. When the CPU 2 accesses the memory 1, the address converter 3 is supplied from the CPU 2 with the coordinate (X, Y) of the two-dimensional data memorized in the memory 1.

Supplied from the CPU 2 with the values n, m, k, X, and Y, the address converter 3 carries out the arithmetic operations given by the above-mentioned equations (1) and (2) to obtain the bank number B and the row address number A. Thus, the address conversion is carried out.

The address converter 3 carries out the address conversion by the above-mentioned arithmetic operations. In accordance with the bank number B and the row address number A, the address converter 3 accesses the memory 1. Upon accessing a plurality of data elements contained in the two-dimensional data memorized in the memory 1, the CPU 1 can successively access those data elements unless they are memorized at the different row addresses in the same bank.

Hereinafter, description will be made about an operation of the memory access system of this embodiment. It is noted here that the address converter 3 is successively supplied from the CPU 2 with the values of n, m, and k.

Upon execution of an instruction code to read the data memorized in the memory 1 or upon execution of an instruction code to write data into the memory 1, the CPU 2 at first sends the coordinate (X, Y) of each data element of the two-dimensional data to be read from or written into the memory 1.

Supplied with the coordinate (X, Y) from the CPU 2, the address converter 3 executes the arithmetic operations given by Equations (1) and (2) by the use of the values of n, m, and k successively supplied to calculate the bank number B and the row address number A.

With reference to the bank number B and the row address number A, the address converter 3 accesses the memory 1. Specifically, in case where the instruction code is a data read instruction, the CPU 2 reads the data memorized in the memory 1 in the bank and at the address indicated by the bank number B and the row address number A thus calculated. In case where the instruction code is a data write instruction, the address converter 3 writes the data in the memory 1 in the bank and at the address indicated by the bank number B and the row address number A thus calculated.

It is assumed that the CPU 2 carries out a read or a write operation for those data elements of the two-dimensional data which are successively arranged, for example, a series of data elements contained in a horizontal region, i.e., successive from a predetermined coordinate in the horizontal direction or a block of data elements contained in a rectangular region starting from the predetermined coordinate. In this event, the above-mentioned operation including the access to the memory 1 is successively carried out in parallel unless the same bank is successively accessed.

Referring to FIG. 3, description will be made about the address conversion in the memory access system of the first embodiment. In FIG. 3, the two-dimensional arrangement data comprise 10×8 data elements. In correspondence to each data element having the coordinate (X, Y), the bank number B and the row address number A are calculated by Equations (1) and (2) where n=3, m=1, and k=2.

It is assumed here that the horizontal region defined by the coordinates (1, 1), (2, 1), (3, 1), and (4, 1) and thus containing four data elements is accessed. In this event, the data elements having the coordinates (1, 1), (2, 1), (3, 1), and (4, 1) in this region are stored in the memory 1 in the banks having the bank numbers 3, 4, 5, and 6, respectively. Therefore, the CPU 2 does not successively access the same bank of the memory 1.

On the other hand, it is assumed that the rectangular region defined by the coordinates (1, 1), (2, 1), (1, 2), and (2, 2) is accessed. In this event, the data elements in this region are stored in the memory 1 in the banks having the bank numbers 3, 4, 5, and 6. If a region greater than 2×2 data elements is accessed, the region may include a plurality of occurrences of the same bank number. Even in this event, the access is efficiently carried out by simply adjusting the order of the access so that the same bank is not successively accessed.

In the first embodiment described above, when the horizontal region including a series of data elements successively arranged or the rectangular region including a block of data elements successively arranged, the data elements in such region are memorized in the different banks of the memory 1 as far as the region is not greater than a predetermined size or a predetermined number of data elements. Therefore, it is unnecessary to inactivate the memory 1 as required in the prior art in case where the different row addresses in the same bank of the memory 1 are successively accessed. This prevents occurrence of a delay in memory access. Accordingly, in case where the two-dimensional data such as image data are accessed, the average access speed to the memory 1 can be increased even if the memory 1 is restricted in access to the different row addresses in the same bank, as in a SDRAM.

Second Embodiment

Referring to FIGS. 1, 2, and 4, description will be made as regards a memory access system according to a second embodiment of this invention.

In FIGS. 1 and 2, the memory access system according to the second embodiment is substantially similar in structure to the first embodiment except that the memory 1 is constituted by a Direct Rambus DRAM and is inhibited from successively accessing different row addresses within the same bank of the banks and from successively accessing adjacent ones of the banks adjacent to each other and that the address converter 3 carries out address conversion in a manner different from that of the first embodiment. In this embodiment, the memory 1 has also the banks, $2^n$ in number. It is, however, assumed in the second embodiment that n represents an integer greater than two.

In the second embodiment, the address converter 3 carries out address conversion to obtain the bank number B and the row address number A by executing arithmetic operations given by:

$$B=[\{Y\times(2^n\times m+k)+X\} \bmod 2^{n-1}]\times 2+\text{INT}([\{Y\times(2^n\times m+k)+X\} \bmod 2^n]/2^{n-1}) \quad (3)$$

$$A=\text{INT}[\{Y\times(2^n\times m+k)+X\}/2^n] \quad (4).$$

The memory access system in this embodiment is substantially similar in operation to the first embodiment except that the bank number calculating unit 31 of the address converter 3 calculates the bank number B in accordance with Equation (3).

Referring to FIG. 4, description will be made about the address conversion in the memory access system of the second embodiment. In FIG. 4, the two-dimensional data comprise 10×8 data elements. In correspondence to each data element represented by the coordinate (X, Y), the bank number B and the row address number A are calculated by Equations (3) and (4), where n=3, m=1, and k=2.

It is assumed here that the horizontal region defined by the coordinates (1, 1), (2, 1), (3, 1), and (4, 1) and thus containing four data elements is accessed. In this event, the data elements having the coordinates (1, 1), (2, 1), (3, 1), and (4, 1) in this region are stored in the memory 1 in the banks having the bank numbers 6, 1, 3, and 5, respectively. Therefore, the CPU 2 does not successively access the same bank of the memory 1.

On the other hand, it is assumed that the rectangular region defined by the coordinates (1, 1), (2, 1), (1, 2), and (2, 2) is accessed. In this event, the data elements in this region are stored in the memory 1 in the banks having the bank numbers 6, 1, 3, and 5. If a region greater than 2×2 data elements is accessed, the region may include a plurality of occurrences of the same bank number. Even in this event, the access is efficiently carried out by simply adjusting the order of the access so that the same bank is not successively accessed.

In the second embodiment described above, when the horizontal region including a series of data elements successively arranged or the rectangular region including a block of data elements successively arranged, the data elements in such region are memorized in the memory 1 in the banks which are different from one another or which are not adjacent to one another. Thus, it is unnecessary to successively access the different row addresses in the same bank or to successively access the adjacent banks. Therefore, it is unnecessary to inactivate the memory 1 so as to successively access the different row addresses in the same bank or to successively access the adjacent banks. This prevents occurrence of delay in memory access. Accordingly, in case where the two-dimensional data such as the image data are accessed, the average access speed to the memory 1 can be increased even if the memory 1 is restricted in access to the different row addresses in the same bank or in access to the adjacent banks, as in a Direct Rambus DRAM.

Modifications

This invention is not restricted to the first and the second embodiments described above but can be modified in other various manners. Some of such modifications will be given below by way of example.

In the first and the second embodiments described above, the memory 1 comprises the SDRAM and the Direct Rambus DRAM, respectively. However, the memory 1 may be of any other type as far as it is divided into a plurality of banks, $2^n$ in number, and is inhibited from successively accessing the different row addresses within the same bank or from successively accessing the adjacent banks.

In the first and the second embodiments described above, the address converter 3 comprises the hardware components logically connected so as to execute the arithmetic operations represented by Equations (1) and (2) and by Equations (3) and (4), respectively. However, the address converter 3 may utilize software or firmware to execute the address conversion. Alternatively, the CPU 2 may carry out the address conversion to access the memory 1 without separately providing the address converter.

As described above, according to this invention, it is possible to efficiently access the memory comprising a plurality of banks restricted in access to the same bank and in access to the adjacent banks.

What is claimed is:

1. A memory access system comprising:
a memory divided into a plurality of banks, $2^n$ in number (n being an integer greater than one), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y);

a memory access unit for accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory; and an address converter comprising a bank number calculating unit for calculating, in response to the coordinate (X, Y) corresponding to said particular data element, the bank number B of a particular bank of said banks where said particular data element is to be memorized, and a row address number calculating unit for calculating, in response to the coordinate (X, Y) corresponding to said particular data element, the row address number A of a particular address of the row addresses of said particular bank where said particular data element is to be memorized, the bank number B and the row address number A being given by:

$$B=\{Y\times(2^n\times m+k)+X\} \bmod 2^n$$

$$A=\text{INT}[\{Y\times(2^n\times m+k)+X\}/2^n],$$

where m is a positive integer, where k is a positive integer smaller than $2^n$ and other than 1, where mod is an operator for calculating a remainder, and where INT is an operator for obtaining an integral quotient;

the bank number B and the row address number A thus calculated being supplied to said memory.

2. A memory access system as claimed in claim 1, wherein said address converter is supplied with values of n, m, and k from said memory access unit.

3. A memory access system comprising:

a memory divided into a plurality of banks, $2^n$ in number (n being an integer greater than two), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y);

a memory access unit for accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory; and an address converter comprising a bank number calculating unit for calculating, in response to the coordinate (X, Y) corresponding to said particular data element, the bank number B of a particular bank of said banks where said particular data element is to be memorized, and a row address number calculating unit for calculating, in response to the coordinate (X, Y) corresponding to said particular data element, the row address number A of a particular address of the row addresses of said particular bank where said particular data element is to be memorized, the bank number B and the row address number A being given by:

$$B=[\{Y\times(2^n\times m+k)+X\} \bmod 2^{n-1}]\times 2 + \text{INT}([\{Y\times(2^n\times m+k)+X\} \bmod 2^n]/2^{n-1})$$

$$A=\text{INT}[\{Y\times(2^n\times m+k)+X\}/2^n],$$

where m is a positive integer, where k is a positive integer smaller than $2^n$ and other than 1, $2^{n-1}-1$, $2^{n-1}$, $2^{n-1}+1$, where mod is an operator for calculating a remainder, and where INT is an operator for obtaining an integral quotient;

the bank number B and the row address number A thus calculated being supplied to said memory.

4. A memory access system as claimed in claim 3, wherein said address converter is supplied with values of n, m, and k from said memory access unit.

5. An address converter for use in combination with a memory and a memory access unit, said memory being divided into a plurality of banks, $2^n$ in number (n being an integer greater than one), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address converter comprising:

a bank number calculating unit for calculating, in response to the coordinate (X, Y) corresponding to said particular data element, the bank number B of a particular bank of said banks where said particular data element is to be memorized; and a row address number calculating unit for calculating, in response to the coordinate (X, Y) corresponding to said particular data element, the address number A of a particular address of the addresses of said particular bank where said particular data element is to be memorized;

the bank number B and the row address number A being given by:

$$B=\{Y\times(2^n\times m+k)+X\} \bmod 2^n$$

$$A=\text{INT}[\{Y\times(2^n\times m+k)+X\}/2^n],$$

where m is a positive integer, where k is a positive integer smaller than $2^n$ and other than 1, where mod is an operator for calculating a remainder, and where INT is an operator for obtaining an integral quotient;

the bank number B and the row address number A thus calculated being supplied to said memory.

6. An address converter as claimed in claim 5, wherein said address converter is supplied with values of n, m, and k from said memory access unit.

7. An address converter for use in combination with a memory and a memory access unit, said memory being divided into a plurality of banks, $2^n$ in number (n being an integer greater than two), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address converter comprising:

a bank number calculating unit for calculating, in response to the coordinate (X, Y) corresponding to said particular data element, the bank number B of a particular bank of said banks where said particular data element is to be memorized; and a row address number calculating unit for calculating, in response to the coordinate (X, Y) corresponding to said particular data element, the row address number A of a particular address of the row addresses of said particular bank where said particular data element is to be memorized;

the bank number B and the row address number A being given by:

$B=[\{Y\times(2^n\times m+k)+X\}\bmod 2^{n-1}]\times 2+\mathrm{INT}([\{Y\times(2^n\times m+k)+X\}\bmod 2^n]/2^{n-1})$ $A=\mathrm{INT}[\{Y\times(2^n\times m+k)+X\}/2^n]$, where m is a positive integer, where k is a positive integer smaller than $2^n$ and other than 1, $2^{n-1}-1$, $2^{n-1}$, $2^{n-1}+1$, where mod is an operator for calculating a remainder, and where INT is an operator for obtaining an integral quotient;

the bank number B and the row address number A thus calculated being supplied to said memory.

8. An address converter as claimed in claim 7, wherein said address converter is supplied with values of n, m, and k from said memory access unit.

9. An address conversion method carried out in an address converter which is for use in combination with a memory and a memory access unit, said memory being divided into a plurality of banks, $2^n$ in number (n being an integer greater than one), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address conversion method comprising:

a bank number calculating step of calculating, in response to the coordinate (X, Y) corresponding to said particular data element, the bank number B of a particular bank of said banks where said particular data element is to be memorized, the bank number B being given by:

$B=\{Y\times(2^n\times m+k)+X\}\bmod 2^n$, where m is a positive integer, where k is a positive integer smaller than $2^n$ and other than 1, and where mod is an operator for calculating a remainder, integral quotient; and a row address number calculating step of calculating, in response to the coordinate (X, Y) corresponding to said particular data element, the row address number A of a particular address of the row addresses of said particular bank where said particular data element is to be memorized, the row address number A being given by:

$A=\mathrm{INT}[\{Y\times(2^n\times m+k)+X\}/2^n]$, where INT is an operator for obtaining an integral quotient;

the bank number B and the row address number A thus calculated being supplied to said memory.

10. An address conversion method carried out in an address converter which is for use in combination with a memory and a memory access unit, said memory being divided into a plurality of banks, $2^n$ in number (n being an integer greater than two), each of which is individually assigned with a bank number B (B being an integer satisfying $0 \leq B \leq 2^n-1$) and includes a plurality of row addresses identified by row address numbers A (A being an integer satisfying $A \geq 0$), said memory being inhibited from successively accessing different row addresses within the same bank of said banks and from successively accessing adjacent ones of said banks which are adjacent to each other, said memory being for use in memorizing two-dimensional arrangement data comprising a plurality of data elements each of which is represented by a coordinate (X, Y), said memory access unit accessing said memory to store said two-dimensional arrangement data into said memory, said memory access unit producing the coordinate (X, Y) corresponding to a particular data element of the data elements of said two-dimensional arrangement data when said memory access unit accesses said memory to store said particular data element into said memory, said address conversion method comprising:

a bank number calculating step of calculating, in response to the coordinate (X, Y) corresponding to said particular data element, the bank number B of a particular bank of said banks where said particular data element is to be memorized, the bank number B being given by:

$B=[\{Y\times(2^n\times m+k)+X\}\bmod 2^{n-1}]\times 2+\mathrm{INT}([\{Y\times(2^n\times m+k)+X\}\bmod 2^n]/2^{n-1})$, where m is a positive integer, where k is a positive integer smaller than $2^n$ and other than 1, $2^{n-1}-1$, $2^{n-1}$, $2^{n-1}+1$, where mod is an operator for calculating a remainder, and where INT is an operator for obtaining an integral quotient; and a row address number calculating step of calculating, in response to the coordinate (X, Y) corresponding to said particular data element, the row address number A of a particular address of the row addresses of said particular bank where said particular data element is to be memorized, the row address number A being given by:

$A=\mathrm{INT}[\{Y\times(2^n\times m+k)+X\}/2^n]$;

the bank number B and the row address number A thus calculated being supplied to said memory.

* * * * *